(12) United States Patent
Marentette

(10) Patent No.: US 7,294,986 B2
(45) Date of Patent: Nov. 13, 2007

(54) REVERSING MOTOR WINDSHIELD WIPER SYSTEM

(75) Inventor: Leslie Marentette, Newmarket (CA)

(73) Assignee: Intier Automotive Closures Inc., Newmarket, Ontario (CA)

(*) Notice: Subject to any disclaimer, the term of this patent is extended or adjusted under 35 U.S.C. 154(b) by 0 days.

(21) Appl. No.: 10/568,668

(22) PCT Filed: Sep. 15, 2004

(86) PCT No.: PCT/CA2004/001625

§ 371 (c)(1),
(2), (4) Date: Feb. 16, 2006

(87) PCT Pub. No.: WO2005/025950

PCT Pub. Date: May 24, 2005

(65) Prior Publication Data
US 2006/0226802 A1  Oct. 12, 2006

(51) Int. Cl.
H02P 1/04 (2006.01)
H02P 5/00 (2006.01)
H02P 7/00 (2006.01)

(52) U.S. Cl. .................. 318/443; 318/444; 318/DIG. 2

(58) Field of Classification Search ........... None
See application file for complete search history.

(56) References Cited

U.S. PATENT DOCUMENTS

| | | | |
|---|---|---|---|
| 3,689,817 A | 9/1972 | Elliott | |
| 4,259,624 A | 3/1981 | Seibicke | |
| 4,336,482 A | 6/1982 | Goertler et al. | |
| 4,599,546 A | 7/1986 | Uemura | |
| 4,670,695 A | 6/1987 | Licata et al. | |
| 4,705,997 A | 11/1987 | Juzswik | |
| 4,742,280 A | 5/1988 | Ishikawa et al. | |
| 4,852,205 A | 8/1989 | Tanaka et al. | |
| 4,866,357 A | 9/1989 | Miller et al. | |
| 5,086,260 A | 2/1992 | Ito | |
| 5,252,897 A | 10/1993 | Porter et al. | |
| 5,256,950 A | 10/1993 | Matsumoto et al. | |
| 5,306,991 A | 4/1994 | Suzuki | |
| 5,355,061 A | 10/1994 | Forhan | |
| 5,506,483 A | 4/1996 | McCann et al. | |
| 5,844,382 A | 12/1998 | Dan | |
| 5,860,185 A | 1/1999 | Ponziani | |
| 5,909,096 A | 6/1999 | Detais | |
| 5,923,137 A | 7/1999 | Amagasa et al. | |
| 5,929,588 A | 7/1999 | Shiah | |
| 5,998,949 A | 12/1999 | Amagasa | |
| 6,002,323 A | 12/1999 | Bomya | |
| 6,249,098 B1 * | 6/2001 | Miyazaki et al. | 318/280 |
| 6,335,601 B1 | 1/2002 | Kato et al. | |
| 6,384,557 B1 | 5/2002 | Weber et al. | |
| 6,609,266 B1 | 8/2003 | Satoh et al. | |
| 2002/0030453 A1 | 3/2002 | Weber et al. | |

\* cited by examiner

Primary Examiner—Lincoln Donovan
Assistant Examiner—Erick Glass
(74) Attorney, Agent, or Firm—Clark Hill PLC

(57) ABSTRACT

A reversing wiper motor system has a first detector including a detectant which rotates in synchronism with the wiper. The detector physically identifies a plurality of distinct angular zones across the entire range of motion of the wiper, including a wiper park zone, a wiping zone, and a wiper out-of-bound zone. A second detector detects incremental movement of the wiper within any given zone. Control circuitry controls the direction of the motor based on the detected zone and the incremental motion of the wiper therein. The system enables the wiper to be located upon power-up.

8 Claims, 12 Drawing Sheets

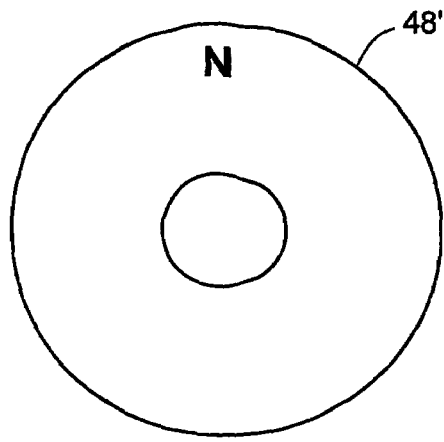
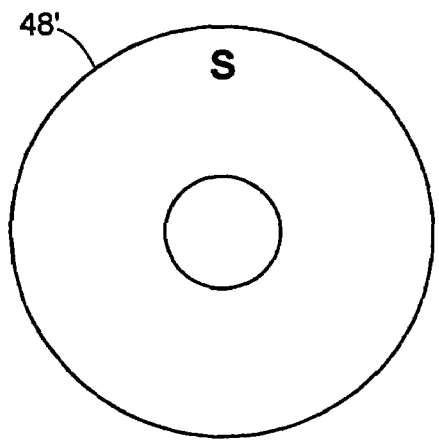
Figure 12A    Figure 12B
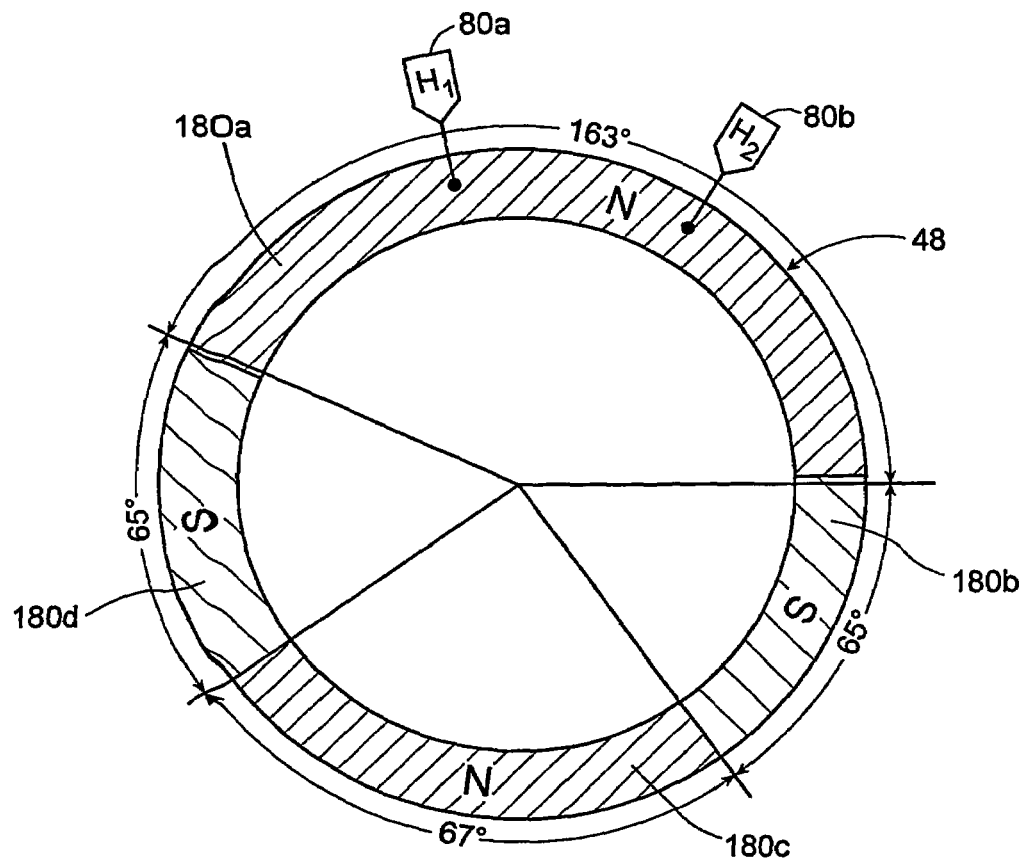
Figure 10

US 7,294,986 B2

REVERSING MOTOR WINDSHIELD WIPER SYSTEM

FIELD OF INVENTION

The invention generally relates to the art of motor control systems and more specifically to the field of reversing-motor windshield wiper systems.

BACKGROUND OF INVENTION

Windshield wiper systems in which the wiper motor reverses direction in order to oscillate or reciprocate the windshield blades are known in the art. Examples of such systems are disclosed in WIPO Publication No. WO 95/33638, WIPO Publication No. WO 98/07601, U.S. Pat. No. 6,249,098, and US Publication No. 2002/0030458.

Reversing wiper motor systems face a number of technical issues. One of these relates to position-determining means. In order to accurately control the wipers, it is desirable to ascertain the angular position and velocity of the wiper motor and/or associated gears with a relatively high degree of precision. The prior art presents various means for accomplishing this objective. For example, the system disclosed in U.S. Pat. No. 6,249,098 to Miyazaki et al. employs a multipole ring magnet disposed on the motor shaft and a co-operating magneto-resistance rotation sensor which generates a pulse train that can be processed by an electronic control unit to determine the velocity of the motor. This system also employs a mechanically actuated position sensor to determine the angular position of a worm gear coupled between the motor and the wiper arms. More specifically, a rotating conductive plate fixed to the worm gear functions as a movable contact in relationship to a number of stationary contacts accommodated within the casing of the system. This system is not preferred because it employs a mechanically-actuated position detecting means which is prone to fatigue and corrosion.

WO 98/07601 to Ponziani also employs a multipole ring magnet disposed on the motor shaft and a co-operating sensor to generate a pulse train which can be used by an electronic control unit to determine the velocity of the motor. A rotating interrupt fixed to the worm gear mechanically interrupts the pulse train so as to indicate the wiper end of travel or reversing position. The problem with such a system is its lack of flexibility, since the wipe angle will remain fixed and cannot be adjusted on the fly to compensate for environmental conditions such as wind speed, nor can the system be readily implemented in other vehicles which require different wipe angles. As such, this system generally undermines many of the advantages otherwise provided by a reversing wiper motor system.

US 2002/0030458 to Weber et al. uses an incremental transducer for detecting the angular distance traveled by the wiper. This system is more flexible than the Ponziani system, but is deficient, inter alia, for not being able to immediately ascertain upon power-up the position of the wipers. Instead this system must first cycle the wipers. In addition, this system appears to rely on memory to determine if the wipers are in a parked position.

Another problem faced by reversing-motor windshield wiper system relates to control requirements. It is desirable for the control system to quickly respond to control events. At the same time, it is generally desirable to reduce the current drawn by the motor, particularly since the power source is a battery. These requirements place conflicting constraints on the control system.

SUMMARY OF INVENTION

One aspect of the invention provides apparatus for oscillating a windshield wiper device having a wiper. The apparatus includes a motor for driving the windshield wiper device. A first detector, which has a detectant that rotates in synchronism with the wiper, physically identifies a plurality of distinct angular zones across the entire range of motion of the wiper. These preferably include a wiper park zone, a wiping zone, and a wiper out-of-bound ("OOB") zone. A second detector detects incremental movement of the wiper within any given zone. Control circuitry is provided for controlling the direction of motion of the motor based on the detected zone and the incremental motion of the wiper therein. With this arrangement, the control circuitry can immediately determine the wiper zone upon power-up.

In the preferred embodiment, the detector physically identifies at least four distinct angular zones for the wiper, including a wiper park zone, a wiper turning point zone, a wiping zone, and a wiper out-of-bound ("OOB") zone;

According to another aspect of the invention, a first detector has a detectant which rotates in synchronism with the wiper and physically identifies a plurality of distinct angular zones for the wiper, including a wiping zone and a wiper out-of-bound ("OOB") zone. A second detector measures incremental movement of the wiper within any given zone. The control circuitry reverses the direction of motion of the motor based on the incremental motion of the wiper in the wiping zone or in the event the first detector detects the out-of-bound zone. Alternatively, the control circuitry generates an error signal when the OOB zone is detected.

Another aspect of the invention relates to a wiper drive which includes a first detector including (i) a binary state detectant which provides at least four uniquely detectable sectors along a path, and (ii) two binary state readers situated along the path that are spaced apart a distance less than the length of the shortest sector along the path. In this arrangement, the readers are fixed in position and the detectant rotates in synchronism with the wiper. A second detector independently detects incremental movement of the wiper in any direction. In this manner, the absolute position of the wiper can be determined whilst avoiding hysteresis problems. Control circuitry is provided for reversing the direction of motion of a drive motor based on the incremental motion of the wiper in two selected adjacent sectors.

The binary state detectant can be implemented by alternating arrangements of magnetic pole polarities, conductive and nonconductive surfaces, or optically reflective and non-reflective surfaces. The binary state readers can thus be magnetic, electric or optical sensors.

According to another aspect of the invention, a multisector binary state detectant and detector can be formed from a two-pole magnet and at least two Hall effect sensors. In this arrangement, preferably the South face of the magnet is overlaid with a ferromagnetic material so as to provide an on and off pattern of South magnetic fields to the Hall effect sensor.

Another aspect of the invention relates to a windshield wiper control system which limits the current drawn by a wiper motor. The control system includes a pulse width modulation (PWM) signal generator for driving a motor bridge circuit. A first control loop provides a first output based on a difference between a measured wiper position and a desired wiper position. A second control loop providing a second output based on a difference between a measured current flowing through the motor and zero current. A summer subtracts the second output from the first output and provides the result to the PWM signal generator. A comparator generates a signal which suppresses the duty cycle provided by the PWM signal generator in the event the measured current exceeds a threshold current.

Another aspect of the invention relates to a system for detecting the angular position of a motor having a rotating output shaft. The system includes a multipole magnet mounted on the output shaft and two digital Hall effect sensors mounted about the shaft to sense variations in magnetic field. The sensors generate pulse trains which are fed, respectively, to at least two pulse-width counters. One counter has a faster prescaler than the other. At high rpm the rotational speed of the motor is measured based on the output of the counter with the faster prescaler and at low rpm the rotational speed of the motor is measured based on the output of the other counter. This facilitates use of a low cost counter or micro-controller whilst avoiding the problem of counter overrun errors.

Another aspect of the invention relates to a system for detecting the angular position of a motor having a rotating output shaft. This system includes a multipole magnet mounted on the output shaft and analog and digital Hall effect sensors mounted about the shaft to sense variations in magnetic field. The digital sensor generates a pulse train which is fed to a pulse width counter. The analog sensor generates a wave train which is processed by a micro-controller to determine motor velocity based on a reference curve. At high rpm the rotational speed of the motor is measured based on the output of the digital sensor, and at low rpm the rotational speed of the motor is measured based on the output of the analog sensor. This facilitates use of a low cost counter or micro-controller whilst avoiding the problem of counter overrun errors.

Another aspect of the invention relates to a worm gear wheel which has teeth designed to mesh with the helical teeth of a worm screw. The gear is made from plastic in order to reduce cost and includes integral stiffening ribs arranged in a honeycomb-like pattern on at least one of the faces of the gear wheel. The gear may also include radially and tangentially orientated stiffening ribs. Collectively, the ribs provide stiffness in three planes to minimize twisting of the gear due to three force vectors produced by the helical teeth.

BRIEF DESCRIPTION OF DRAWINGS

The foregoing and other aspects of the invention will be understood and appreciated more fully from the following detailed description taken in conjunction with the following drawings, in which:

FIG. 10 is a diagram illustrating the pole regions of a magnet used in the position sensing system of the preferred embodiment;

FIGS. 12A and 12B are diagrams of the front and rear sides of a magnet employed in a position sensing system according to an alternative embodiment of the invention.

DETAILED DESCRIPTION OF PREFERRED EMBODIMENTS

Figure 1:
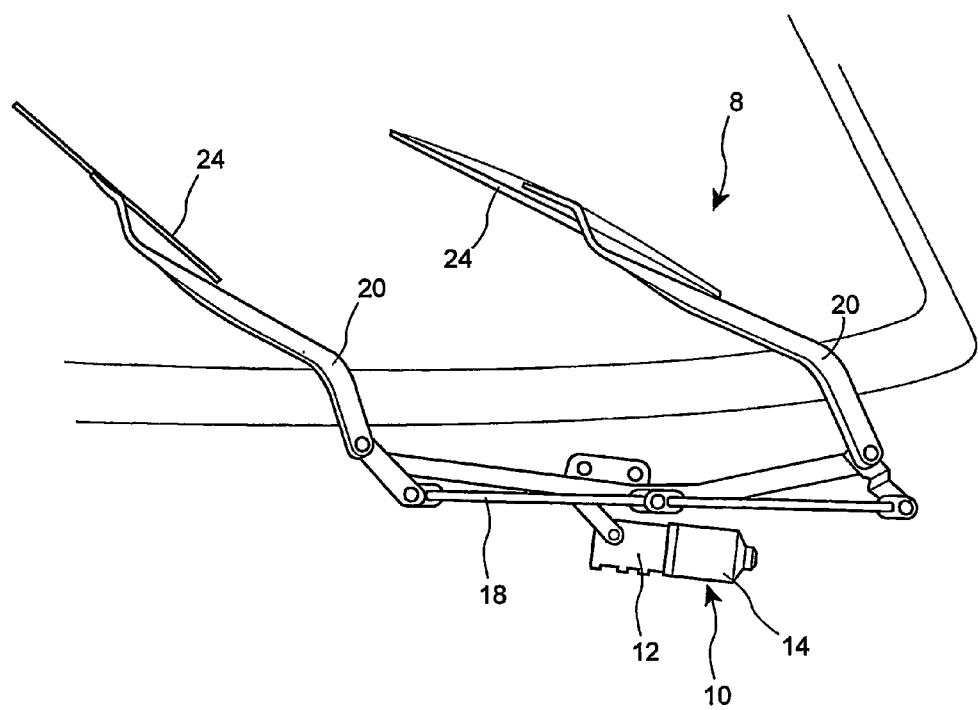
FIG. 1 is a perspective view of a reversing-motor windshield wiper system according to a preferred embodiment.
Figure 2:
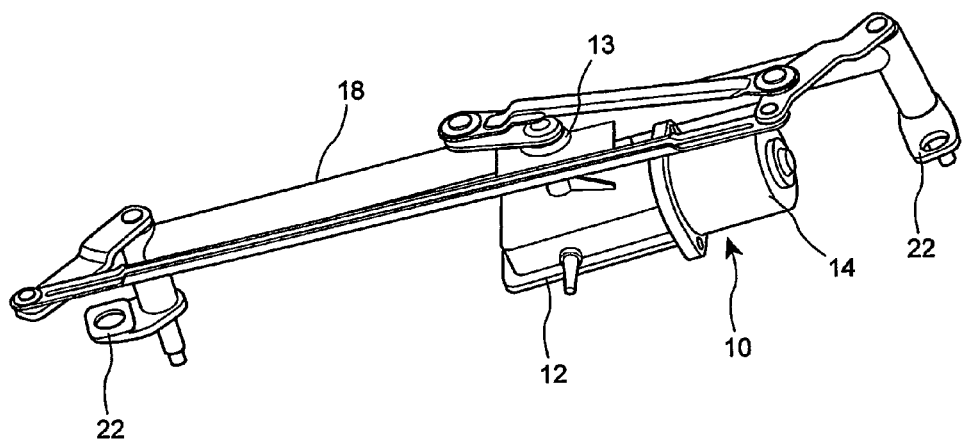
FIG. 2 is a partial assembly view of the windshield wiper system shown in FIG. 1.

FIGS. 1 and 2 show a reversing-motor windshield wiper system 8 including a wiper power unit 10 constructed according to the preferred embodiment. The power unit 10 comprises a drive motor 14 connected to a gearbox housing 12. Referring additionally to the exploded view of the power unit 10 in FIG. 3, the housing 12 includes an outlet 13 for an output shaft 16 which drives a linkage 18 onto which two wiper arms 20 are mounted (at mounts 22). The linkage 18 drives the two wiper arms 20 (FIG. 1), each of which carries a wiper blade 24. The invention may employ conventional linkage mechanisms as known in the art per se. As described in greater detail below, the motor 14 is controlled to rotate in different angular directions in order to oscillate the wiper arms 20 across the windshield.

Figure 3:
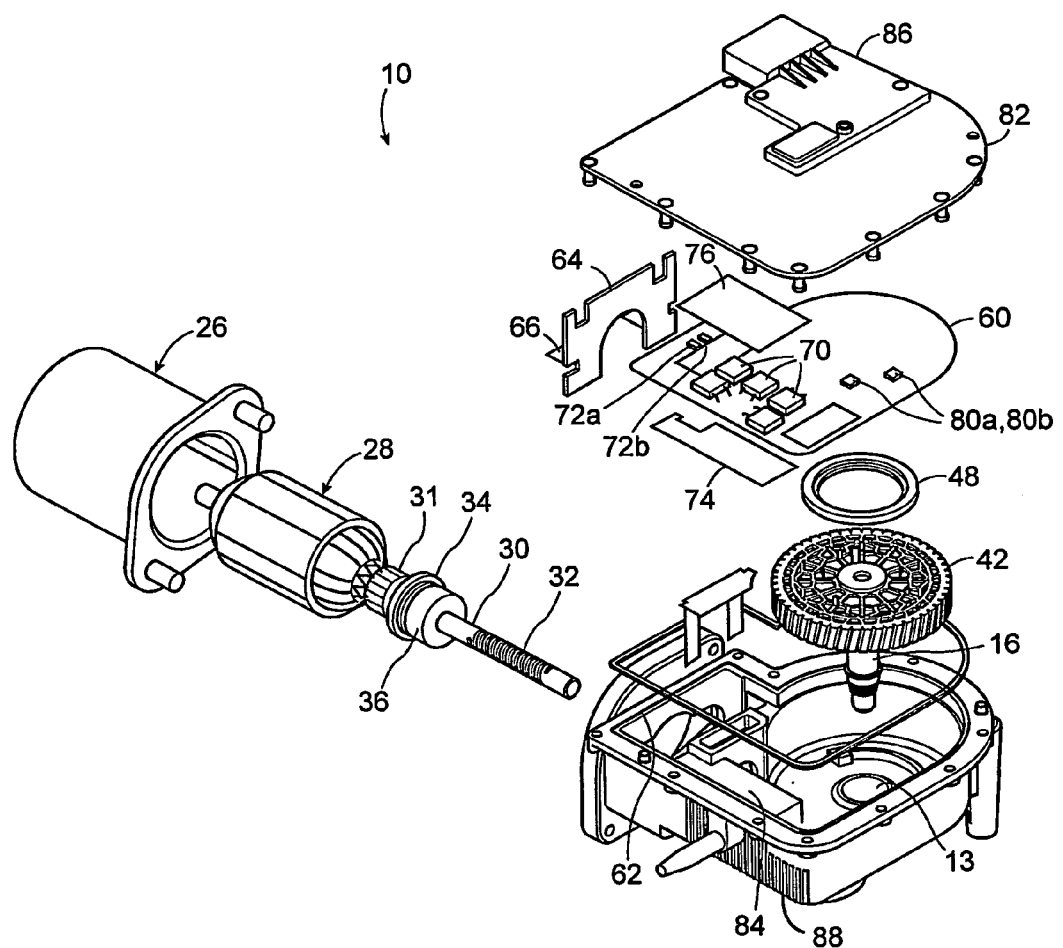
FIG. 3 is an exploded view of a power unit according to the preferred embodiment.
Figure 4:
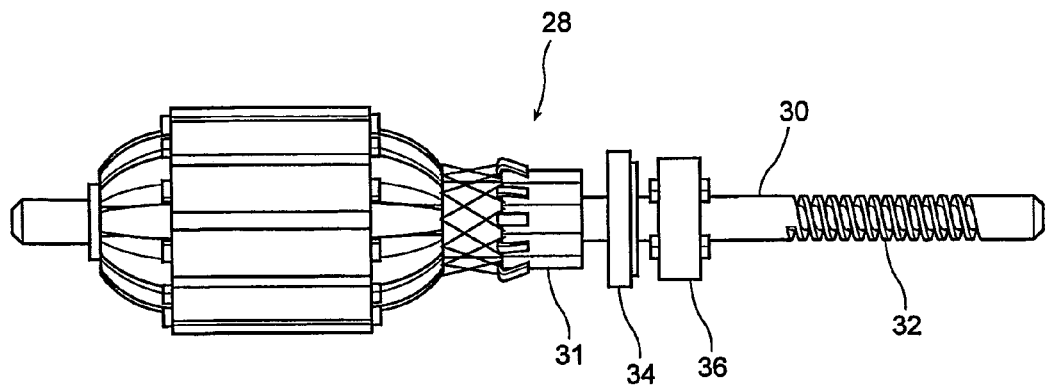
FIG. 4 is an assembly view of a motor rotor shown in FIG. 3.

As shown in FIG. 3, the motor 14 comprises a stator 26 and a rotor 28, which is shown in isolation in FIG. 4. The constructional details of the motor 14 are not important to the invention and it may employ conventional AC or more preferably DC windings as shown in the drawings or as known in the art per se. The rotor 28 includes a rotating shaft 30 which is journaled in the housing 12 via a ball bearing 36 fitted in a groove 40 (see FIG. 5) formed in the housing. The shaft 30 carries (FIGS. 3 & 4) a ring-like commutation bar 31 and, in one embodiment, a multi-polar ring magnet 34 for position sensing purposes as described in greater detail below. The shaft 30 also includes an integral worm 32 which, in assembly, meshes with a worm gear 42 (FIG. 3) that is integrally formed on the output shaft 16. This arrangement allows for gear ratios on the order of 70:1, hence reducing the torque requirements of the motor.

As a result of the direct connection between the worm 32 and worm gear 42, driving the motor 14 in one rotational sense causes the output shaft 16 and wiper arms 20 to rotate in one rotational sense and driving the motor in the opposite rotational sense causes the output shaft and wiper arms to rotate in the opposite rotational sense. As described in greater detail below, the motor is controlled such that the worm gear 42 rotates less than 360°. In the event of a control system failure, the worm gear 42 includes a tab 44 (as seen best in FIG. 6A) which will abut against fail-safe stops 46a and 46b formed in the housing 12 (as seen best in FIG. 5), thus providing a physical limitation to the angular travel of the worm gear 42 and the wiper arms 20. The tab 44 preferably includes metal inserts which serve to strengthen the tab against sheer forces. An alternative embodiment for limiting the angular travel of the worm gear 42 is shown schematically in FIG. 6D. In this embodiment a sector 43 of the worm gear 42 is not toothed. This sector is normally not engaged by the worm 32 but in the event of a control system failure the worm 32 will bite into the non-toothed sector 43 thus stopping the motion of the wiper arms. In the absence of such a failsafe mechanism the wiper arms may become damaged or damage the vehicle trim. Advantageously, the means for limiting the angular travel of the wiper arms is incorporated in the housing 12.

Figure 6A:
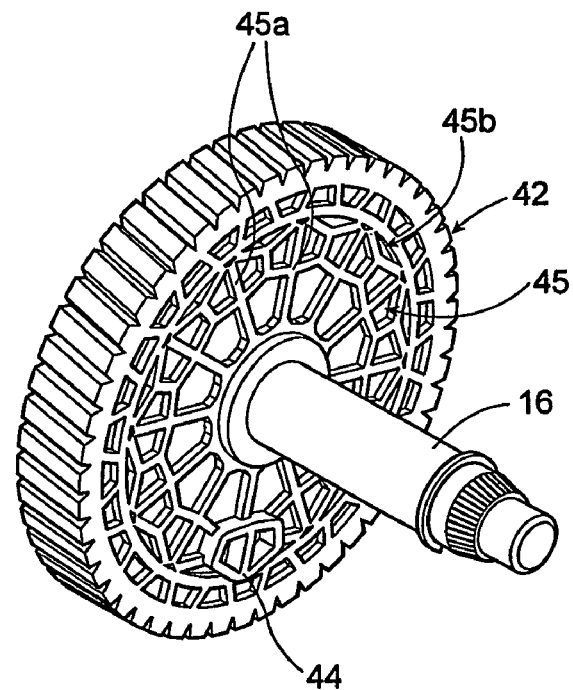
FIGS. 6A and 6B are front and rear perspective views of a worm gear shown in FIG. 3.

In the preferred embodiment, the worm gear 42 is constructed of plastic in order to reduce manufacturing cost. The gear 42, however, is subject to considerable torsional stresses. As seen best in the detailed perspective view of FIG. 6C, the gear 42 includes a network of stiffening ribs 45 arranged in a honeycomb-like structure which create stiffness in three planes to minimize twisting of the gear due to the three force vectors produced by the helical teeth. The network includes radially orientated ribs 45a, tangentially orientated ribs 45b, and ribs 45c which are both tangentially and radially orientated. The network of stiffening ribs may be formed over a disk substrate if desired.

Figure 6B:
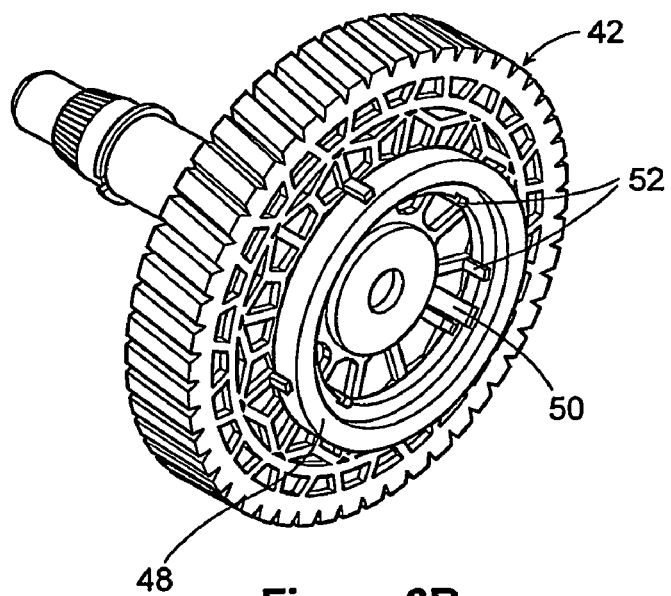
Figure 6C:
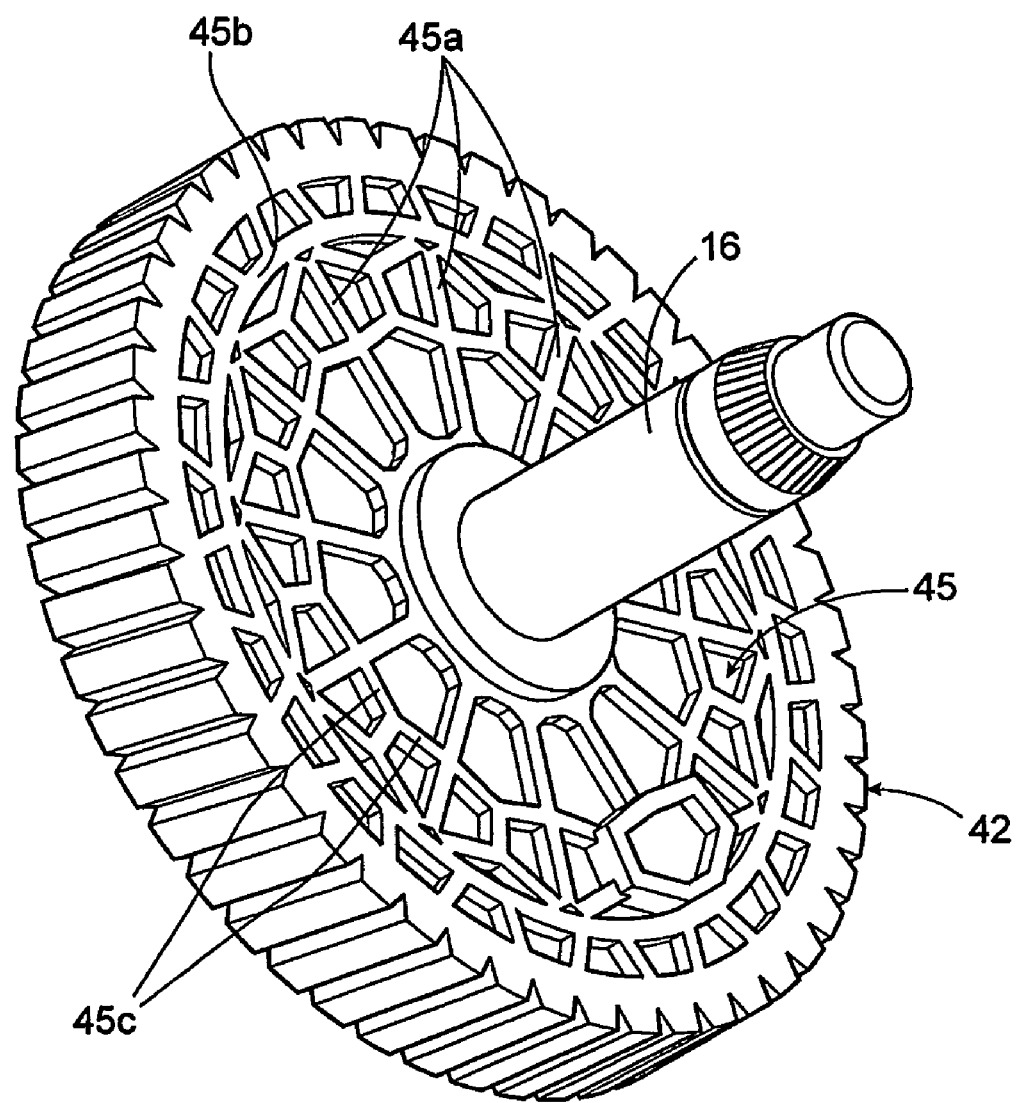
FIG. 6C is a more detailed front perspective view of the worm gear.

The worm gear 42 carries a multi-polar magnet 48 (FIGS. 3 & 6B) which is keyed relative to the gear by a key 50 and otherwise retained by clips 52 (FIG. 6B). The magnet 48 functions as another sensor for position sensing purposes, as described in greater detail below. The output shaft 16 of the worm gear 42 is journaled in the outlet 13 via a sleeve bearing (not shown).

Figure 5:
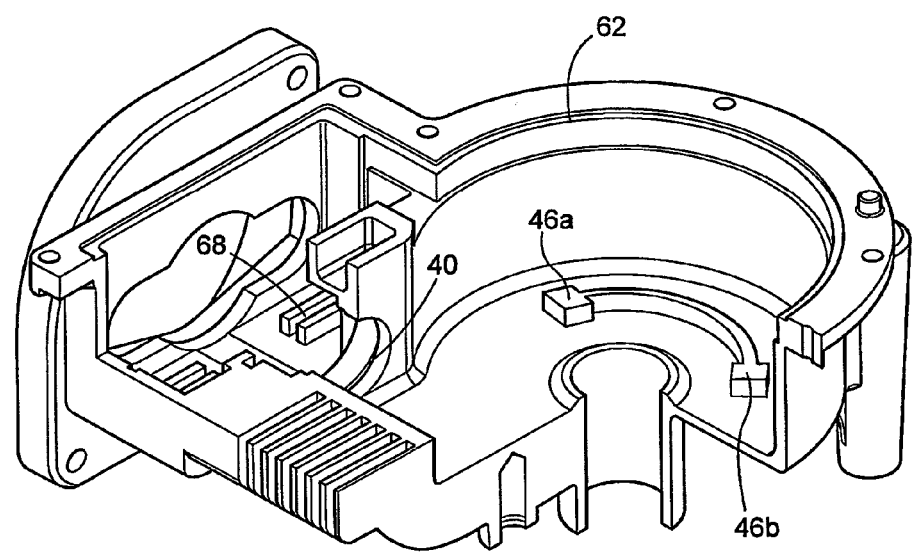
FIG. 5 is a fragmentary view of the interior of a gearbox housing shown in FIG. 3.
Figure 6D:
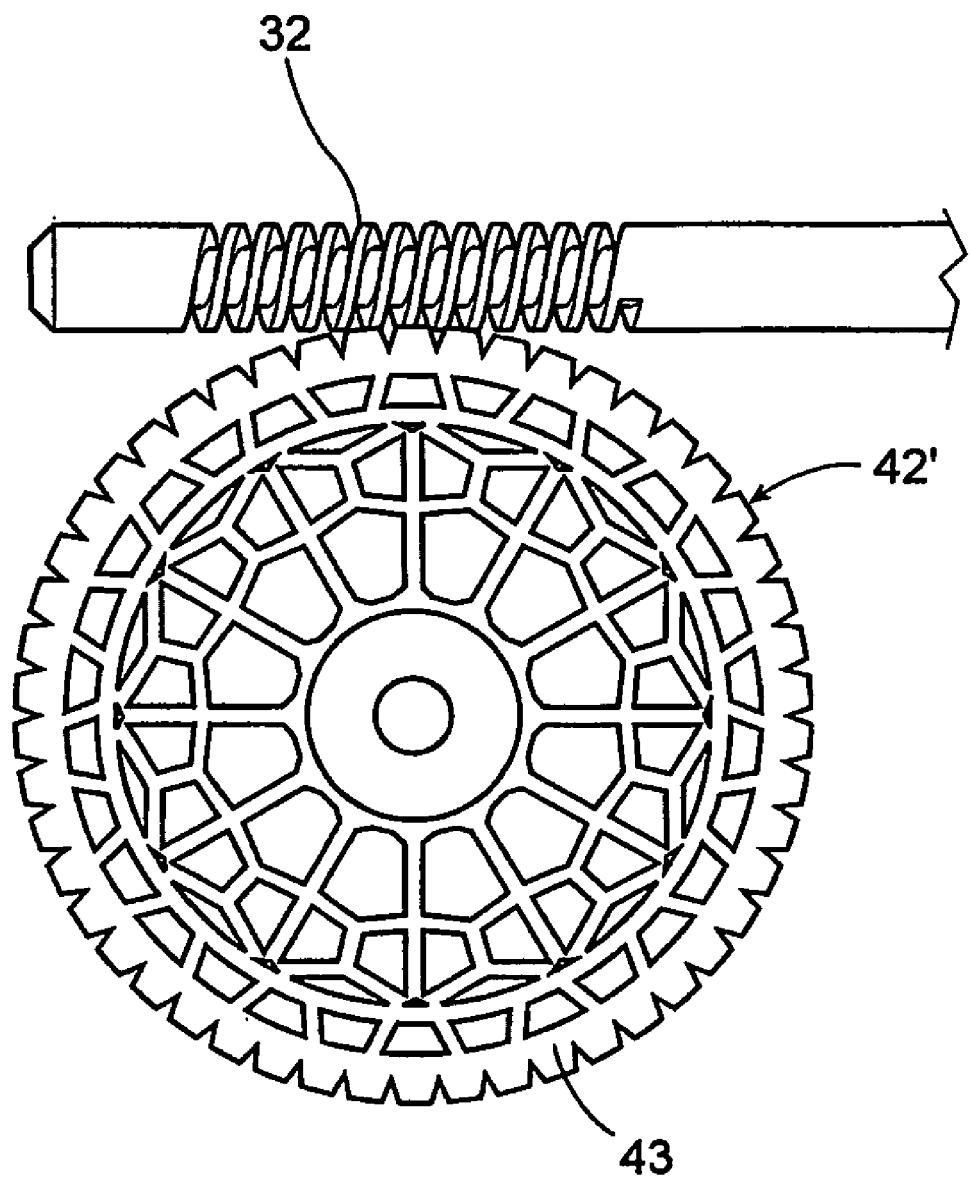
FIG. 6D is a schematic diagram of an alternate embodiment of the work gear.

As shown in FIG. 3, a printed circuit board (PCB) 60 is mounted in the gearbox housing 12 against support surface 62 (as seen more clearly in FIG. 5). A brush card 64, which includes brushes 66 for commutation of the motor 14, is electrically connected to the PCB 60. The brush card 64 is physically mounted in slots 68 (FIG. 5) formed in the housing 12. A digital micro-controller 78 such as Mitsubishi part no. M30262F8GP is mounted on the PCB 60 and a flash memory for storing a servo-control program is connected to the micro-controller 78. The PCB 60 includes power switches such as FETs 70 (FIG. 3) which provide an H-bridge for controlling the motor 14. The PCB 60 also includes (on its underside, in FIG. 3) Hall effect sensors 72a, 72b for sensing magnet 34 and Hall effect sensors 80a, 80b for sensing magnet 48. Collectively, the PCB 60 and brush card 64 provide an on-board electronic servo-control system, which is discussed in greater detail below.

The gearbox housing 12 is sealed with a preferably metallic cover 82. An electrical connector 86 for connecting the PCB 60 to the vehicle control system is mounted atop the cover 82.

The PCB 60 and FETs 70 generate a significant amount of heat which must be dissipated. In the preferred embodiment, two layers of thermally conductive rubber 74, 76 are employed to protect the PCB 60 against shock and assist in dissipating heat. Rubber layer 74 is mounted between the bottom of the PCB 60 and a shelf 84 formed in the housing 12. The shelf 84 is integrated with a plurality of cooling fins 88 formed on the exterior of the housing 12. Rubber layer 76 is disposed on top of the FETs 70 and is in contact with the metallic top cover 82 thus providing a low resistance heat conduction path to the other side of the housing 12.

The servo-control system has to deal with a number of demanding requirements. A typical wiper movement cycle occurs in about one second, during which time the motor 14 must accelerate to operating speed, and then de-accelerate and brake as the wiper arm reaches its end of travel or turning position, following which the motor must again accelerate and brake as the wiper arm returns to its original position. Since it is preferred to use a relatively low torque, low cost motor, in a typical application the motor may be required to spin up to about 3000 rpm, brake and coast down to zero rpm in about 500 ms. In addition to these demanding performance requirements, it is simultaneously desirable to limit the output torque of the motor because the transition points on the worm 32 and worm gear 42 (i.e., the points on the gears corresponding to a change in rotational direction) will generally be at the same spot. At this point the wiper arms present a high inertial load, and hence a high impact load on specific gear teeth, leading to potential fatigue problems. Similarly, it is also desirable to minimize the current drawn by the motor. This is due in part to the fact that the motor is powered by a battery, which is limited in the amount of current it can supply. In addition, it is also desirable to minimize power ($I^2R$) losses resulting from high current draws, and thus limit heat dissipation requirements.

Figure 7:
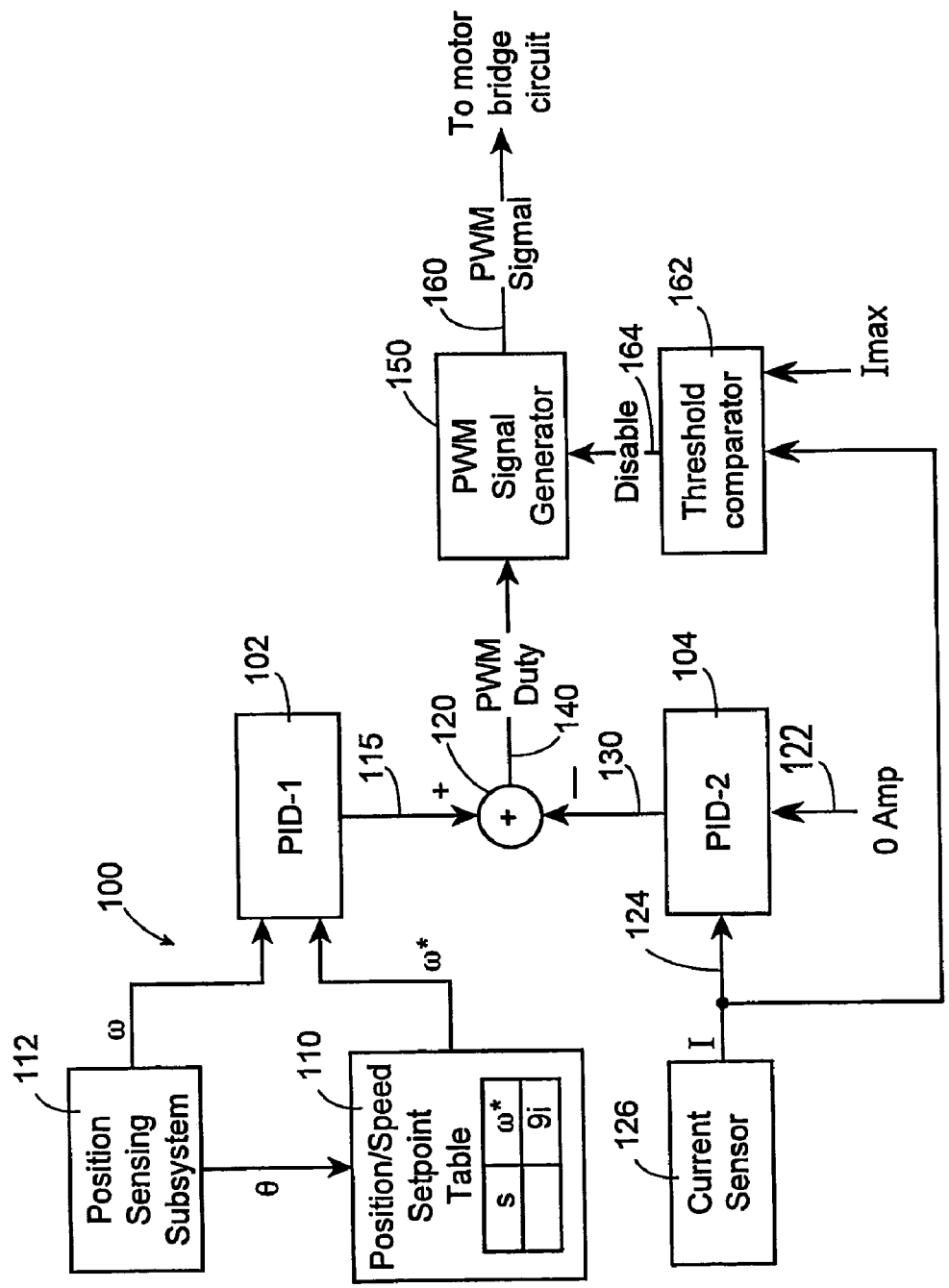
FIG. 7 is a schematic block diagram of a servo control system according to the preferred embodiment.

To accommodate these various conflicting servo-control requirements, the windshield washer system employs a software-implemented control algorithm 100, as shown in block diagram form in FIG. 7, which is stored in the flash memory and executed by the on-board micro-controller 78. The servo-control program 100 implements two proportional, integral, derivative (PID) control loops, comprising PID controllers 102 and 104. The first control loop attempts to set the output speed of the motor based on a pre-determined angular position/speed set point table 110. This table 110 provides the desired motor velocity $\omega^*$ based on the measured angular position $\theta$ of the worm gear 42. A position sensing subsystem 112 which is discussed in greater detail below measures the angular position $\theta$ of the worm gear 42 and its angular velocity $\omega$. The measured velocity $\omega$ and the set point velocity $\omega^*$ are provided as inputs to the PID controller 102 which produces an output 115 so as to minimize the error between $\omega^*$ and $\omega$. The PID controller output 115 is provided as first input to a summer 120.

The second control loop, comprising PID controller 104, attempts to minimize the current draw. One of the inputs 122 to the PID controller 104 is set to zero, reflecting a current set point of zero amperes. The actual current $I_m$ is measured by a current sensor 126 as known per se in the art and provided as a second input 124 to the PID controller 104. The PID controller 104 produces an output 130 which thus attempts to reduce the current draw to zero. The PID output 130 is provided as a second input to the summer 120.

The summer 120 subtracts PID output 130 from PID output 115. The output 140 of the summer 120 represents the duty cycle of a pulse-width-modulated (PWM) signal and is fed into a PWM signal generator 150 which produces a corresponding PWM signal 160. The PWM signal 160 is used to drive the H-bridge circuit which controls the current supplied to the motor 14.

In order to eliminate the possibility of servo-control over-response during acceleration or de-acceleration which could result in excessive current being drawn from the vehicle battery, the servo-control system includes circuitry for limiting the current draw to a pre-determined level. As shown in FIG. 7, a threshold comparator 162 compares the measured current $I_m$ against a preset current level $I_{max}$. In the event $I_m > I_{max}$, the output 164 of the comparator 162 forces the PWM signal generator 150 to generate a zero percentage duty cycle PWM signal, thus shutting off current to the motor.

Figure 8:
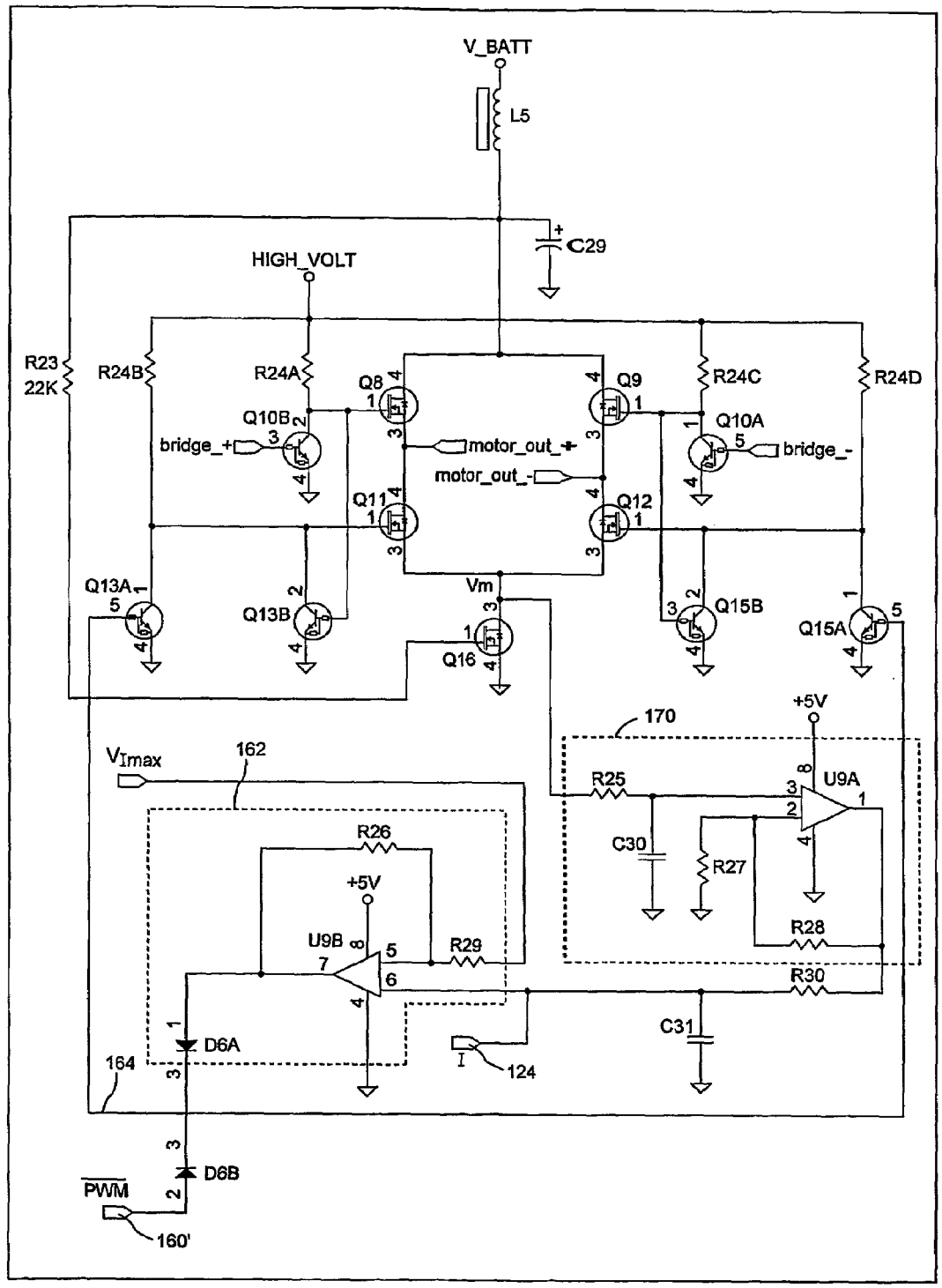
FIG. 8 is a circuit diagram of a power switching bridge according to the preferred embodiment.

FIG. 8 shows the H-bridge and comparator circuitry in greater detail. FETs Q8, Q9, Q11 and Q12 are the power switches 70 of the H-bridge. FETs Q13A, Q13B, Q15A and Q15B provide a control bridge. When these FETs are turned on the bridge is de-activated (i.e., power is not applied to the motor). An inverse PWM signal $\overline{PWM}$ 160' drives the control bridge. The voltage $V_m$ across FET Q16 is proportional to the current flowing through the motor. This voltage $V_m$ is amplified by a gain amplifier 170 and fed as one of the inputs to the threshold comparator 162. The other input is a voltage $V_{I\text{-}max}$ representing $I_{max}$. The output 162 of the comparator is "0" (logic low voltage) when $V_m$ is less than the threshold value $V_{I\text{-}max}$, which will turn off Q13A and Q15A and activate the bridge. The output 162 is "1" (logic high voltage) when the threshold value is exceeded, which will turn on Q13A and Q15A thus de-activating the bridge. The comparator 162 is a hysteresis comparator whereby its output 164 will not return to zero until the measured current I subsides to a predetermined reset value $I_{reset}$, $I_{reset}<I_{max}$.

Figure 9:
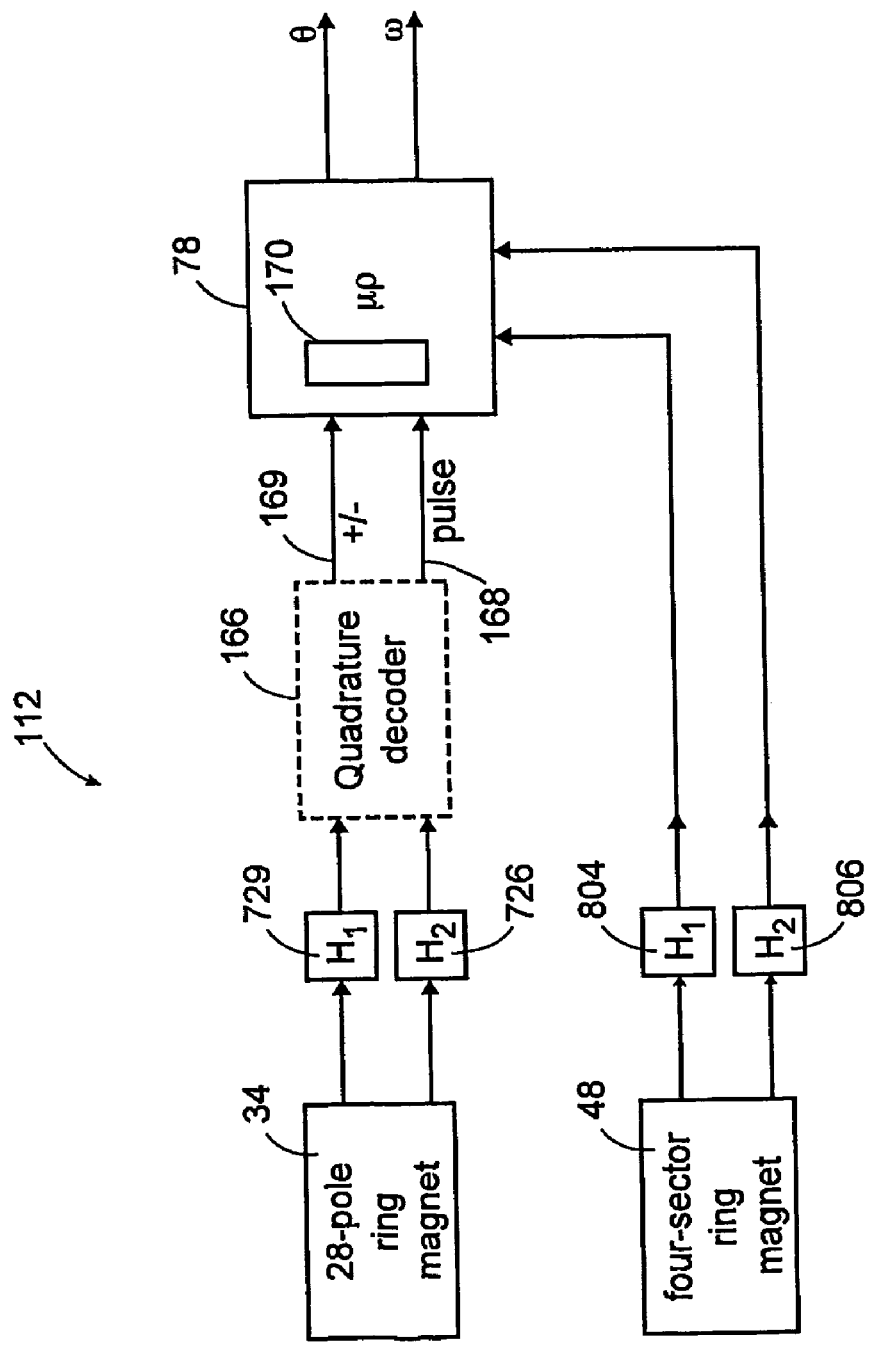
FIG. 9 is a schematic block diagram of a position sensing subsystem according to the preferred embodiment.

FIG. 9 shows one embodiment of the position detecting subsystem 112 in block diagram form. The subsystem 112 comprises ring magnets 34 and 48. Magnet 34 is a multipole (e.g., 28 pole) ring magnet, as schematically depicted in FIG. 6B, which is read by Hall effect sensors 72a, 72b. These sensors 72a, 72b are spaced apart such that they generate two 90° out-of-phase signals 168, 169 that are interpreted by a quadrature decoding function as known in the art per se provided by the microcontroller 78. The microcontroller 78 adjusts an index counter (internal to the microcontroller 78) whenever signal 168 (the "pulse" signal) is pulsed as a result of detecting a magnetic pole transition. More particularly, the index counter is either incremented or decremented depending on whether the other signal 169 (the "direction" signal) leads or lags the pulse signal 168. In the preferred embodiment about 1200 pulses (with quadrature) represents a half-cycle of wiper arm travel.

In alternative embodiments, quadrature decoding circuitry 166 (shown in phantom) as known in the art per se which includes a phase comparator may be employed external of the microcontroller 78 for providing a pulsating signal 168 and a phase comparison signal representing the direction of rotation.

In the preferred embodiment the Hall sensors 72a, 72b are digital sensors whose signals are fed into two different pulse-width counters with dissimilar prescalers (these components preferably form a part of the circuitry 166). For example, one of the counters may be operating at 1 MHz and the other at 8 MHz. The faster sensor is used to measure velocity at high armature speeds, e.g., greater than 400 rpm, and the slower sensor is used to measure velocity at low armature speeds. By splitting the total velocity range into two bands, the position sensing system can provide greater velocity sensitivity using a small, low cost, sixteen bit counter or micro-controller whilst avoiding counter overrun problems.

If desired, one of the Hall sensors 72a, 72b may be an analog sensor and the other a digital sensor, such that the direction signal 169 is an analog signal and the pulse signal 168 is a digital signal. At high armature speeds, e.g., greater than about 600-715 rpm, the digital pulse signal 168 provided by the digital Hall effect sensor is processed by the microcontroller 78 to increment or decrement the index counter. The microcontroller 78 can quantize the analog direction signal 169 as digital logic high or digital logic low (e.g., 5V or 0V) and thus is able to determine motor direction by comparing it against the digital pulse signal 168. However, at low motor velocity (where the digital sensor risks counter overrun problems) the index counter is incremented or decremented based on the analog direction signal 169. More particularly, as the magnet 34 rotates, it generates a sinusoidal magnetic energy pattern which is picked up by the analog Hall sensor and reflected in the direction signal 169. This enables the microcontroller 78 to determine the direction and velocity of the motor by comparing the sinusoidal signal against preset points on a reference sinusoidal curve. For example, at low motor speeds the microcontroller can sample the analog direction signal at preset intervals, e.g., every 3 ms. These two voltage samples represent points on a gauss sine curve. The voltages are normalized and converted via an arcsine function into angular positions on a reference sine curve. The reference sine curve is configured based on a known velocity required to traverse one pole in 3 ms. (For example, a 28 pole magnet requires a speed of approximately 715 rpm for one magnetic pole to traverse a the Hall sensor in 3 ms.) The two measured angular positions are subtracted and the result divided by 360 degrees, leaving a number that represents the percentage of one magnetic pole traversed in the last 3 ms. The speed of the motor can be determined by multiplying this number against the known velocity at 3 ms per pole. The direction of the motor can be ascertained by changes in the measured angular positions.

Magnet 48 is employed to determine the position of the worm gear 42 and wiper arms 20, particularly upon power-up where the wiper arms 20 may be situated in an unknown position. More particularly, magnet 48 provides plural magnetic sectors as shown in FIG. 10. With two Hall effect sensors 80a, 80b and four magnetic sectors 180a . . . 180d, the position detecting subsystem 112 can detect four distinct zones. Whenever a zone crossing is detected, the subsystem 112 updates or resets the motor index counter to a predetermined value based on the mechanical configuration between the motor 14 and worm gear 42. The index counter is incremented or decremented based on the output of the other Hall effect sensors 72a, 72b, such that the angular position and velocity of the worm gear 42, and hence the wiper arms 20, is determined from the absolute zone information provided by the 4-sector magnet 48 on the worm gear 42 and the relative motor position provided by the multi-pole magnet 34 on the motor shaft 30.

If desired, the multi-pole magnet 34 on the motor shaft may be replaced with a commutation sensor as known in the art which provides an output representative of the angular position of the motor. Alternatively, a second finely graduated magnetic encoder as known in the art may be mounted on the worm gear 42 to indicate the relative position of the wiper arms. It will also be appreciated that the detectors and detectants may be based on optical signals and sensors instead of magnetic signals and sensors. Alternatively still, the worm gear may also employ absolute or virtual absolute position encoders as known in the art to provide position information.

Figure 11:
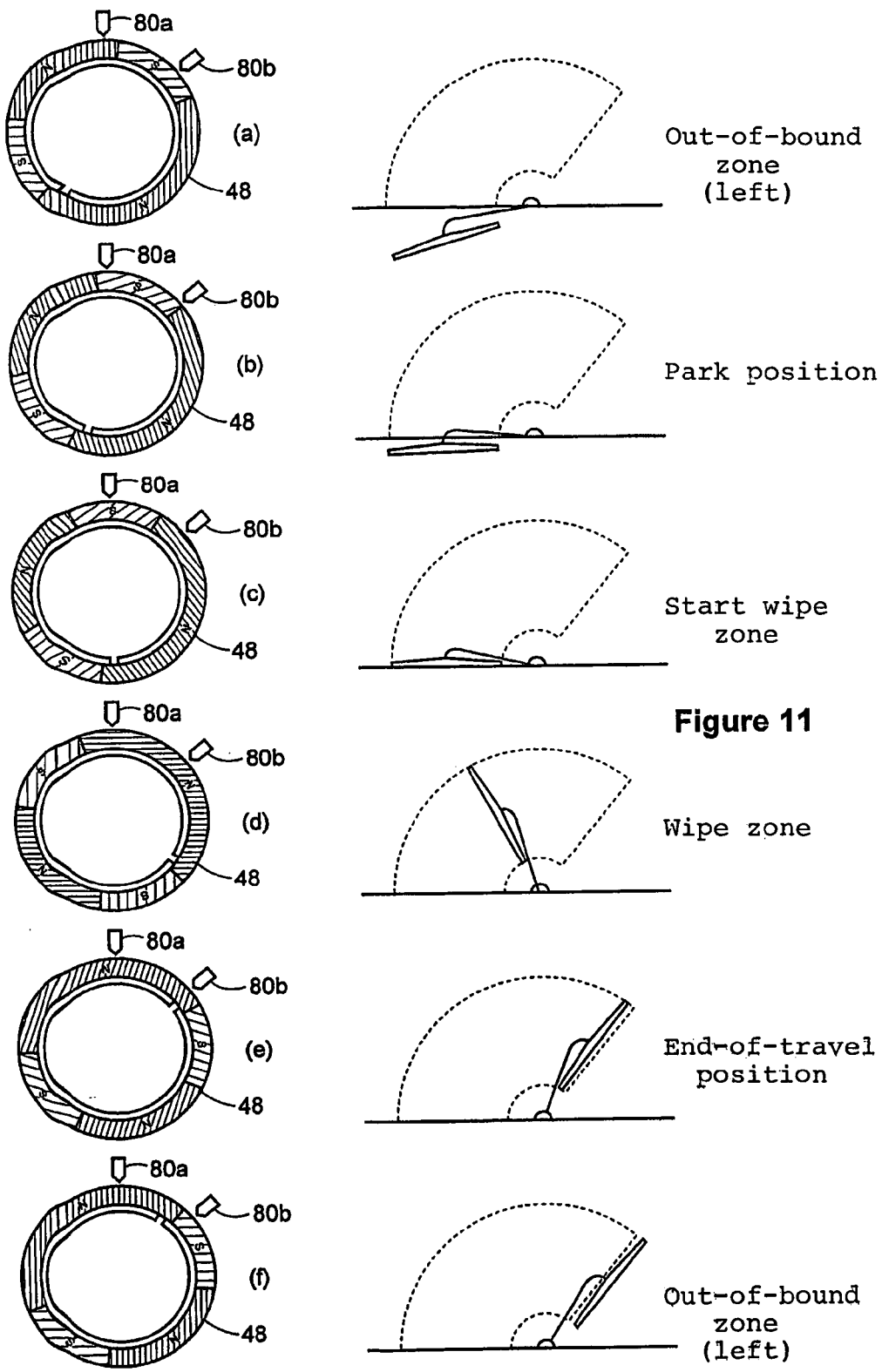
FIG. 11 is a schematic diagram showing the positions of the magnet (shown in FIG. 10) corresponding to various phases of a wipe cycle, according to the preferred embodiment.

FIG. 11 shows the positions of the sector magnet 48 over the corresponding cycle of motion of the windshield wiper arms 20. The positions are enumerated in the table set out below:

| Position | Hall Sensors $H_1$ $H_2$ | Position/Zone |
|---|---|---|
| (a) | 10 | Out-of-bound zone (left) |
| (b) | 00 | park position |
| (c) | 01 | start wipe zone |
| (d) | 11 | wipe zone |
| (e) | 11 | EOT position |
| (f) | 10 | out-of-bound zone (right) |

The cycle of motion of the windshield wiper arms 20 defines the following positions or zones: the out-of-bound (OOB) zone represents an impermissible wiper position; the park position or park zone corresponds to a range of angular positions for the worm gear 42 corresponding to the wiper arms 20 being parked; the start wipe zone indicates the worm gear position(s) where the wiper arms 20 change direction at one end of travel; the wipe zone is self-explanatory; and the end of travel (EOT) zone represents the worm gear position(s) where the wiper arms 20 change direction at the other end of travel.

More specifically, when the four-sector magnet 48 is in position (a) as shown in FIG. 11, Hall effect sensor 80a detects a North pole and Hall effect sensor 80b detects a South pole, leading to a "10" state, representing one of the out-of-bound zones. In position (b), the Hall effect sensors 80a and 80b both detect South poles, leading to "00" state in binary logic. This is the start wipe zone. As the worm gear 42 and magnet 48 are rotated counterclockwise the Hall effect sensors 80a and 80b enter a "01" state, representing the wipe zone. The EOT position within the wipe zone is detected by comparing the value of the index counter against a predetermined threshold value. At this point, the servo-control system reverses the wiper arms 20 until the start wipe zone is detected and the motor index counter has reached a predetermined value, at which point the wiper arms 20 will once again be reversed.

The OOB zones function as a failsafe reverse indicator. In the event the index counter malfunctions or is caused to malfunction by manual intervention, the four-sector magnet 48 physically identifies the impermissible zone, e.g., as in position (f) in FIG. 11, thus allowing the servo-control system to reverse the direction of the motor 14 at this point. Alternatively, an error condition can be signaled as known in the art.

Note that the position sensing subsystem 112 can ascertain immediately upon power up the zone the wiper blades 24 are located in (OOB, park, start wipe, and wipe), without recourse to memory. Upon startup, the servo-control system can begin to cycle the wiper arms 20 by rotating them in either direction. As soon as the Hall effect sensors 80a and 80b register a state transition the angular position of the worm gear 42 and hence the position of the wiper arms 20 is known absolutely. The micro-controller 78 uses this information to reset the motor index counter to a pre-determined value, as described previously.

Figure 13:
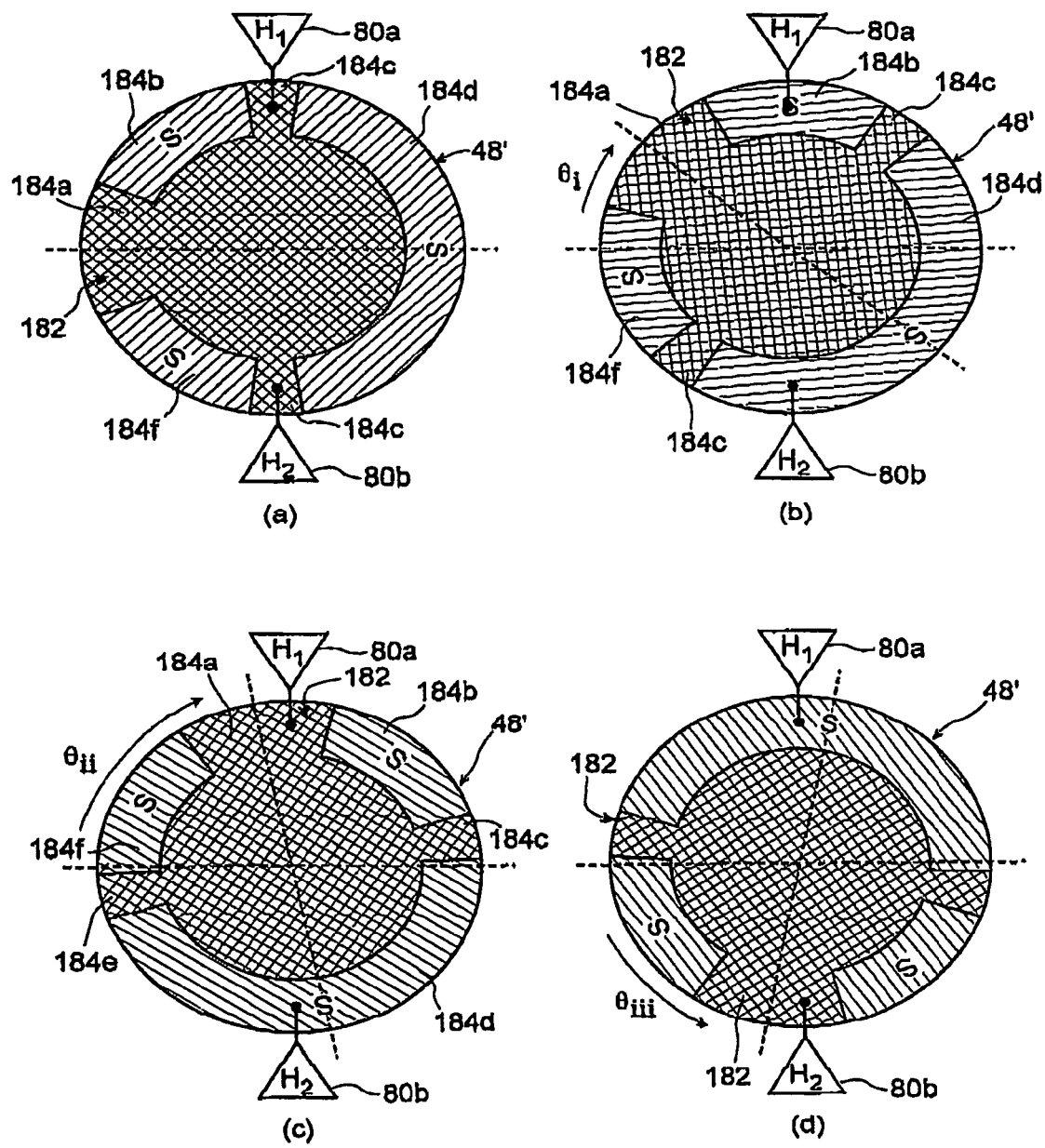
FIG. 13 is a schematic diagram showing the positions of the magnet (shown in FIGS. 12A & 12B) corresponding to various phases of a wipe cycle, according to the alternative embodiment.

In an alternative embodiment the four sector magnet 48 may be replaced by a single pole magnet 48' as shown in FIGS. 12A & 12B, wherein one face of the magnet 48' has a North orientation and the other face has a South orientation. In this case, since Hall effect sensors typically only sense the presence or absence of a South pole, a metallic (ferromagnetic) plate 182 may be used as shown in FIG. 13 to provide a pattern of magnetic pole sectors 184a . . . 184f that are sensed by the Hall effect sensors 80a, 80b, which in this embodiment are arranged 180° apart. The metallic plate 182 diverts or bends the magnetic flux lines so they are not detectable by the Hall effect sensors 80a, 80b (which in practice are positioned over an annular rim of the magnet 48' as schematically indicated in FIG. 12).

As seen in FIG. 13, the pole sectors 184a . . . 184f are arranged to correspond with four zones used to control wiper arm 20 movement; (i) park zone, which indicates the range of angular positions .for the worm gear 42 corresponding to the wiper arms 20 being parked; (ii) start zone, which indicates the worm gear position(s) where the wiper arms 20 change direction at one end of travel; (iii) wipe zone; and (iv) end of travel (EOT) zone which indicates the worm gear position(s) where the wiper arms 20 change direction at the other end of travel. More specifically, in position (a) the Hall effect sensors 80a and 80b do not detect South poles, leading to a "11" state in binary logic. This is the start zone. In position (b) the magnet 48' is rotated clockwise by an angle $\theta_i$ such that both Hall effect sensors 80a and 80b detect South poles, leading to a "00" state. This is the wipe zone. In position (c) the magnet 48' is rotated even further clockwise $\theta_{ii}$ such that sensor 80a=1 and sensor 80b=0. This is the EOT zone. In position (d) the magnet 48' is rotated counterclockwise $\theta_{iii}$ with respect to position (a) such that sensor 80a=0 and sensor 80b=1. This is the park zone.

In the alternative embodiment the position sensing subsystem 112 can also immediately ascertain upon powering up in which zone the wiper blades 24 are located. As soon as the Hall effect sensors 80a and 80b register a state transition the angular position of the worm gear 42 is known absolutely. The micro-controller 78 uses this information to reset the motor index counter to a pre-determined value, as discussed previously.

The sector pattern of the alternative embodiment, however, does have hysteresis problems. In particular, because magnetic sectors 184c and 184e are situated 180° apart and the Hall effect sensors 80a, 80b are also situated 180° apart, given the finite width of the edge of the metallic plate 182 it is possible for one of the Hall effect sensors 80a, 80b to register a change of state prior to the other sensor, leading to a misreporting of the actual zone. The control system can compensate for this problem by waiting for a short time period before acting upon a change of state, but this will delay the responsiveness of the system somewhat. In the preferred embodiment, however, as shown in FIG. 10, the arc length between the Hall effect sensors 80a and 80b is relatively small, e.g., less that 65°, and the arc length of each magnetic sector on magnet 48 is greater than the arc length between the Hall effect sensors 80a and 80b. Thus, the Hall effect sensors 80a, 80b cannot change state simultaneously, eliminating the above-noted concern. The preferred embodiment thus employs a grey code strategy known in the art.

Those skilled in the art will appreciate that numerous modifications and variations may be made to the embodiments disclosed herein without departing from the spirit of the invention.

The invention claimed is:

1. Apparatus for oscillating a windshield wiper device having a wiper, comprising:
   a) a motor for driving the windshield wiper device;
   b) a first detector including a detectant fixed to a rotary body which rotates in synchronism with the wiper and a reader fixed in position and in non-contact relation with the detectant, the first detector identifying a plurality of distinct angular zones for the wiper, including a wipe zone and a wiper out-of-bound ("OOB") zone;
   c) a second detector for detecting incremental movement of the wiper within any given zone; and
   d) control circuitry for reversing the direction of motion of the motor based on the incremental motion of the wiper in the wipe zone and for reversing the motor or generating an error signal in the event the first detector detects the out-of-bound zone.

2. Apparatus according to claim 1, wherein at least one of the zones represents permissible wiper park positions ("park zone"), the park zone being intermediate of the wipe zone and the OOB zone.

3. Apparatus for oscillating a windshield wiper device having a wiper, comprising:
   a) a motor for driving the windshield wiper device;
   b) a first detector including a, detectant fixed to a rotary body which rotates in synchronism with the wiper and a reader fixed in position and in non-contact relation with the detectant, the first detector identifying a plurality of distinct angular zones across the entire range of motion of the wiper, said zones including a wiper park zone, a wipe zone, and a wiper out-of-bound ("OOB") zone;
   c) a second detector for detecting incremental movement of the wiper within any given zone; and
   d) control circuitry for controlling the direction of motion of the motor based on the detected zone and the incremental motion of the wiper therein;
   e) whereby, upon power-up, the control circuitry can immediately determine the wiper zone.

4. Apparatus for oscillating a windshield wiper device having a wiper, comprising:
   a) a motor for driving the windshield wiper device;
   b) a first detector including a detectant fixed to a rotary body which rotates in synchronism with the wiper and a reader fixed in position and in non-contact relation with the detectant, the first detector identifying at least four distinct angular zones for the wiper, including a wiper park zone, a wiper turning point zone, a wipe zone, and a wiper out-of-bound ("OOB") zone;
   c) a second detector for detecting incremental movement of the wiper within any given zone; and
   d) control circuitry for reversing the direction of motion of the motor based on the incremental motion of the wiper in the wiper turning point zone and the wipe zone;
   e) whereby, upon power-up, the control circuitry can immediately determine if the wiper is in the park zone, the wipe zone or the OOB zone.

5. Apparatus for oscillating a windshield wiper device having a wiper, comprising:
   a) a motor for driving the windshield wiper device;
   b) a non-mechanically actuated first detector, including a detectant which provides at least four detectable binary state sectors along a path and two readers situated along the path that are spaced apart a distance less than the length of the shortest sector along the path, wherein the detectant is fixed to a rotary body and rotates in synchronism with the wiper and the readers are fixed in position and in non-contact relation with the detectant;
   c) a second detector for independently detecting incremental movement of the wiper in any direction; and
   d) control circuitry for reversing the direction of motion of the motor based on the incremental motion of the wiper in two selected adjacent sectors.

6. Apparatus according to claim 5, wherein the path is circular.

7. Apparatus according to claim 5, wherein the sectors are alternating arrangements of: magnetic pole polarities; conductive and nonconductive surfaces; or reflective and non-reflective surfaces.

8. A control system for a wiper driven by a reversible electric motor, comprising:
   a) a pulse width modulation (PWM) signal generator for driving a motor bridge circuit;
   b) a first control loop providing a first output based on a difference between a measured wiper position and a desired wiper position;
   c) a second control loop providing a second output based on a difference between a measured current flowing through the motor and zero;
   d) a summer for subtracting the second output from the first output and providing the result to the PWM signal generator; and
   e) a comparator for generating a signal which suppresses the duty cycle provided by the PWM signal generator in the event the measured current exceeds a threshold current.

\* \* \* \* \*